US006387454B1

(12) United States Patent
Crook et al.

(10) Patent No.: US 6,387,454 B1
(45) Date of Patent: May 14, 2002

(54) STABILIZING A GLASS-CERAMIC

(75) Inventors: Russell A. Crook, Painted Post; James E. Webb, Corning, both of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/535,587

(22) Filed: Mar. 27, 2000

Related U.S. Application Data
(60) Provisional application No. 60/131,013, filed on Apr. 26, 1999.

(51) Int. Cl.$^7$ .......................... B05D 1/18; C03C 25/24; C03C 17/30
(52) U.S. Cl. ................. 427/407.1; 427/407.2; 427/302; 428/447; 65/432; 65/60.2; 65/60.8
(58) Field of Search .................... 427/407.1, 407.2, 427/302; 428/446, 447, 453; 65/430, 432, 443, 447, 448, 60.1, 60.2, 60.3, 60.8

(56) References Cited

U.S. PATENT DOCUMENTS 3,681,122 A    8/1972   Domicone et al.
4,209,229 A    6/1980   Rittler
4,976,148 A *  12/1990  Migliori et al. ................ 73/579
5,104,209 A    4/1992   Hill et al. ....................... 385/27
5,351,321 A    9/1994   Snitzer et al. ................. 385/10
5,759,618 A *  6/1998   Taylor ........................ 427/140
6,177,534 B1 * 1/2001   Antonucci et al. ............. 528/26

FOREIGN PATENT DOCUMENTS

EP      0 565 743         10/1993
EP      0 590 564          4/1994
EP      0 590 564 A1 *     4/1994   ........... C03C/17/42
EP      0 799 873         10/1997
FR      2752 834           3/1998
JP      53006314 A *       1/1978

* cited by examiner

*Primary Examiner*—Shrive P. Beck
*Assistant Examiner*—William P. Fletcher, III
(74) *Attorney, Agent, or Firm*—Milton M. Peterson; Angela N. Nwaneri

(57) ABSTRACT

A method of stabilizing a glass-ceramic body, particularly an aluminosilicate body, for use as a telecommunications component in a humid atmosphere, comprises coating the body with an aqueous solution of an alkali metasilicate, with a solution of a silane that is strongly non-polar with respect to water, or with successive applications of the metasilicate and the silane.

8 Claims, 6 Drawing Sheets

STABILIZING A GLASS-CERAMIC

This application claims the benefit of U.S. Provisional Application, Ser. No. 60/131,013, filed Apr. 26, 1999 entitled PROCESS FOR THE STABILIZATION OF BETA-EUCRYPTITE FOR USE IN NON-HERMETIC ENVIRONMENTS, by Russell A. Crook and James E. Webb.

BACKGROUND OF THE INVENTION

Glass-ceramics are well known, synthetic, inorganic materials. In general, they are produced by melting an appropriate precursor glass and developing at least one crystal phase, in situ, in the glass. This is usually accomplished by a thermal treatment that converts a portion of the glass to one or more crystal phases that are uniformly dispersed in a matrix glass. Glass-ceramics are commonly designated by the name or nature of their predominant, or primary, crystal phase.

Numerous different types of glass-ceramics, that provide widely different properties, have been developed. Thus, glass-ceramics having coefficients of thermal expansion (CTEs) that vary from very high positive coefficients to relatively low negative coefficients are described in the prior art. While not so limited, the present invention is particularly concerned with aluminosilicate glass-ceramics, in particular, a beta-eucryptite glass-ceramic having a negative CTE.

Beta-eucryptite, glass-ceramic bodies have found applications in telecommunication components. One such application is in Bragg gratings in fibers that are athermal, that is, are temperature compensating. For example, as shown in FIG. 1, one such device takes the form of a fiber having a positive CTE that is mounted on a substrate having a negative CTE. This arrangement compensates for a refractive index change in the fiber as well as its positive CTE. Bragg gratings in fibers and their production are described in detail in U.S. Pat. No. 5,104,209 (Hill et al.) and U.S. Pat. No. 5,351,321 (Snitzer et al.). For this use, it has been found desirable to employ an aluminosilicate glass-ceramic, in particular, a beta-eucryptite glass-ceramic having a negative CTE.

Unfortunately, aluminosilicate glass-ceramics tend to exhibit highly microcracked, porous structures that provide high surface areas. When this feature is combined with the highly polar nature of the glass-ceramic composition, the result is a strong tendency to absorb moisture in the microcracked structure. The reaction of the moisture with a polar component in the glass-ceramic, in particular, alumina, causes the glass-ceramic to grow dimensionally. Such growth, of course, renders the material unsatisfactory for use as a grating.

The reaction of the glass-ceramic with moisture also tends to alter the composition of the glass-ceramic and, consequently, its CTE value. This, of course, is a further destabilizing effect that is undesired.

It is, therefore, a basic purpose of the present invention to provide a method of stabilizing a microcracked glass-ceramic, in particular, an aluminosilicate glass-ceramic, against a hot, humid atmosphere with minimal change in dimension and CTE value due to reaction with moisture.

Another purpose is to provide a stabilized, glass-ceramic component for use in telecommunication equipment.

A further purpose is to provide a method of treating a microcracked glass-ceramic to enable its use with minimal change in either dimension or CTE due to reaction with moisture.

A specific purpose is to provide a method of treating a microcracked glass-ceramic material having a negative CTE to permit its use in producing a temperature-compensating Bragg grating in a fiber.

Another specific purpose is to provide a temperature-compensating, Bragg grating adapted to use in a hot, humid atmosphere.

SUMMARY OF THE INVENTION

The invention resides in part in a method of stabilizing a glass-ceramic body, that has a large, internal surface area, against change in dimension and/or CTE value when the body is exposed to a humid atmosphere, the method comprising coating the body with an aqueous solution of an alkali metasilicate, a non-aqueous solution of a silane that is strongly non-polar with respect to water, or successive coatings of the metasilicate and the silane.

The invention further resides in a glass-ceramic body having a large, exposed, internal surface area that is exposed to external atmospheric conditions, the body being coated with an aqueous solution of sodium metasilicate, a non-aqueous solution of a silane that is strongly non-polar with respect to water, or a combination of the metasilicate and the silane, whereby the body is stabilized against change in dimension and/or CTE value.

DESCRIPTION OF THE DRAWINGS

In the accompanying drawings.

DESCRIPTION OF THE INVENTION

The present invention arose from a need to stabilize a beta-eucryptite glass-ceramic body for use in a telecommunication system. Therefore, the invention is described with respect to aluminosilicate glass-ceramics, beta-eucryptite being a typical member of that glass-ceramic family. However, application of the invention to other microcracked glass-ceramics, where problems arise due to the microcracks, will be evident.

Figure 1:
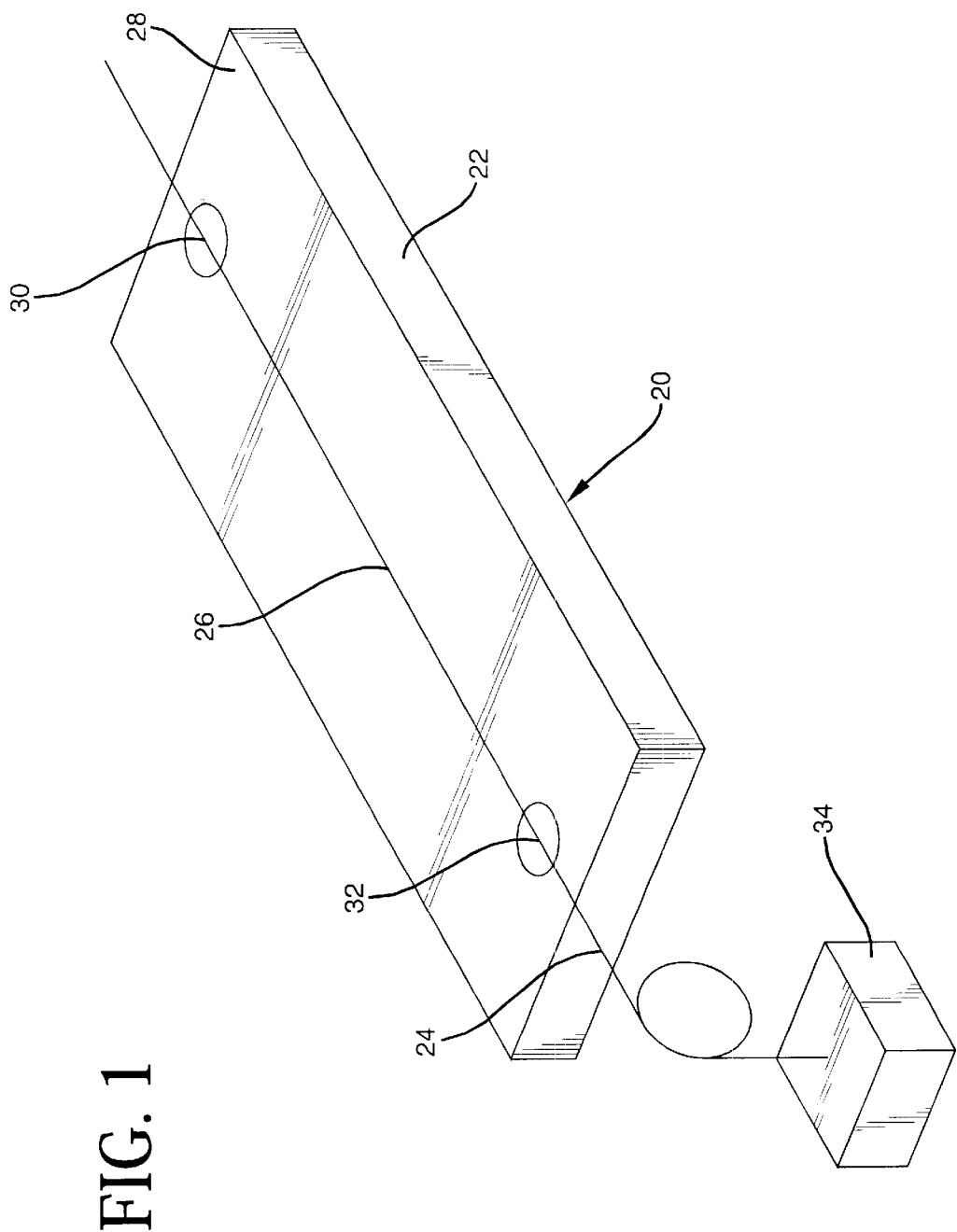
FIG. 1 is a perspective view of an athermal, optical fiber, grating device illustrating an application of the present invention.

For convenience, reference will be made to a simple, but typical, athermalized, fiber Bragg grating in describing the invention. A simple perspective view of such a grating is shown in FIG. 1 of the accompanying drawing.

A refractive (or Bragg) grating is a photosensitive device which reflects light over a narrow wavelength band. Typically, these devices have channel spacings measured in nanometers. One method of constructing an optical filter, utilizing the Bragg effect, involves imprinting at least one periodic grating in the core of an optical fiber. The core is exposed through its cladding to the interference pattern of two ultraviolet beams. This exposure results in a reflective grating which may be oriented normal to the fiber axis.

The frequency of light reflected by a fiber grating normally varies with the temperature of the grating region.

Consequently, such a filter cannot be used in applications where the reflected light frequency should remain relatively independent of temperature. The necessity of devising a system that is insensitive to temperature change is apparent.

One such proposed athermal device embodies a fiber component having a positive CTE that is attached to the surface of a substrate having a negative CTE. A lithia aluminosilicate glass-ceramic, beta-eucryptite, has been proposed as a substrate material having a negative CTE. A silica, or germania-silica fiber, with a positive CTE, is attached to the beta-eucryptite substrate.

FIG. 1 shows a grating device designated by the numeral 20. Device 20 has a substrate 22 formed from a flat block of beta-eucryptite. An optical fiber 24, having at least one UV-induced reflective grating 26 written therein, is mounted on the surface 28 of substrate 22. Fiber 24 is attached at either end of the surface 28 at points 30 and 32. Attachment of fiber 24 to substrate 22 at points 30 and 32 is accomplished with a small button of sealing glass material 34.

In the grating device shown, it is important that fiber 24 is always straight and not subject to compression as a result of the negative expansion. Thus, fiber 24 is usually mounted under tension. Before attachment, it is placed under a controlled tension, the proper choice of which assures that the fiber is not under compression at all anticipated use temperatures.

As indicated earlier, it is desirable to avoid dimensional change in the substrate. To avoid the influence of temperature change, the balance of positive and negative CTEs is employed. However, beta-eucryptite has a strong tendency to microcrack. This poses a problem when the material must operate in the presence of moisture, particularly under highly humid conditions.

It has been found that moisture has two undesirable effects on a microcracked glass-ceramic, particularly on a highly polar material such as beta-eucryptite. First, the entry of moisture into the tip of a crack or pore opening tends to cause the crack in the stressed material to propagate and deepen. This, in turn, creates an undesirable dimensional change in the body.

It has also been found that the moisture tends to react with the alumina and silica along the wall of the crack at, and back from, the tip of the crack. This fills in the tip which may stop progress of the crack. While this is desirable, it also tends to alter the CTE of the material. This is an undesirable effect that alters the balance between the substrate and the fiber CTEs. To counter these undesirable effects, studies have been made on materials capable of blocking entry of the moisture into the microcracks. Two systems of measurement have been employed to determine the effect of moisture on the material; also, to determine the effectiveness of treatments designed to minimize this moisture effect. One measurement system essentially employs a micrometer to measure dimensional change transversely of a block or sheet of material.

The other measurement system employs a technique known as resonant ultrasound spectroscopy (RUS). In the present application of this technique, the technique is employed to provide a continuing measurement of the frequency of a selected mechanical resonance mode in a material. There are a multiple of resonant frequencies that may be measured. Since they change in a similar or corresponding manner, as a practical matter, a given frequency is selected and followed over time. A value, termed the modulus (E), is measured as characteristic of a material. This value is proportional to the square of the frequency. Thus, $E \approx f^2$.

Figure 2:
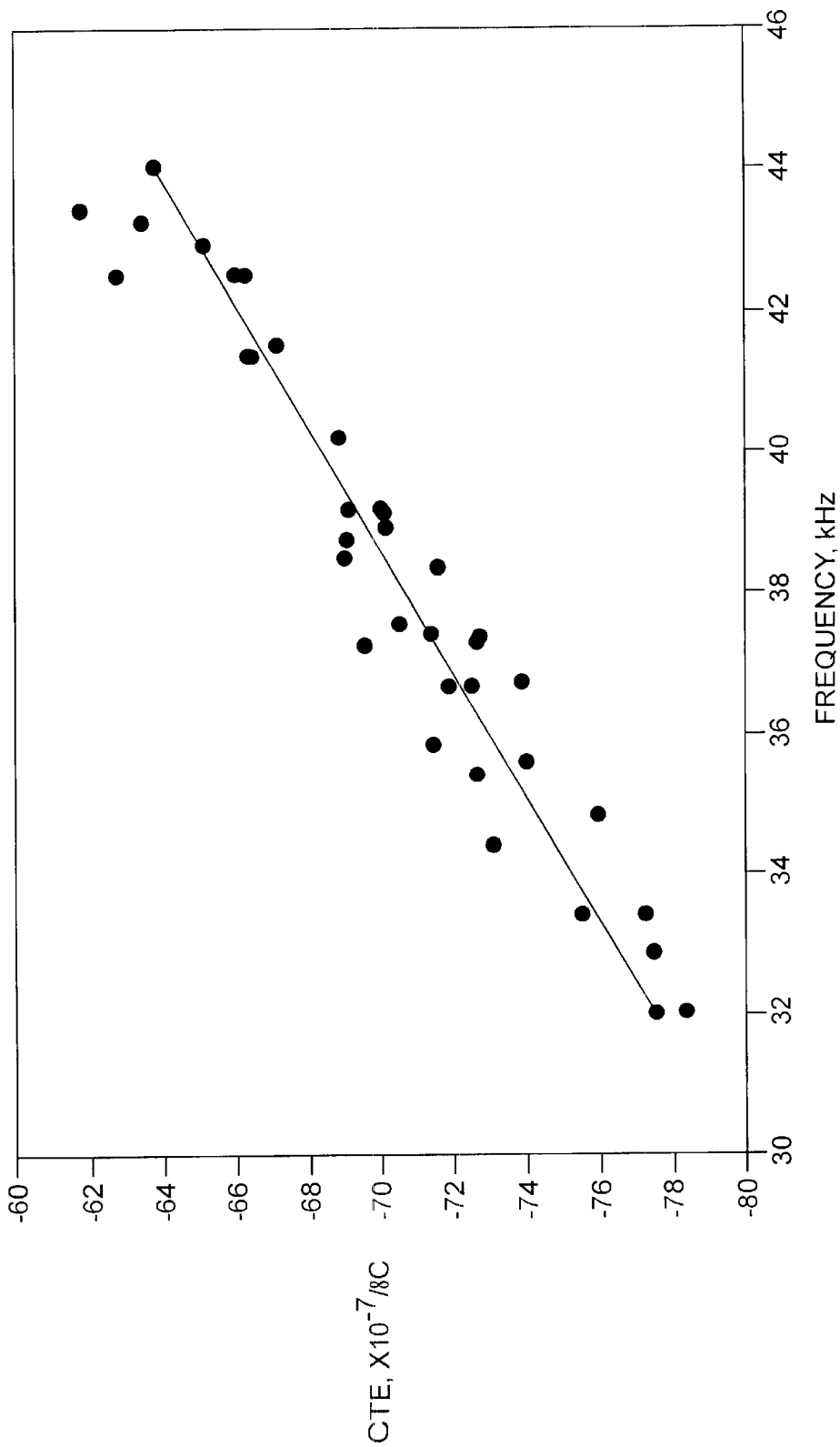
FIG. 2 is a graphical representation showing the relationship between the CTE of a material and frequency as measured in kHz.

FIG. 2 is a graphical representation showing the relationship between CTE and frequency, the measured value used to determine modulus. In FIG. 2, $CTE \times 10^{-7}/°C$. values are designated on the vertical axis, while frequencies, as measured in kilo-Hertz (kHz), are designated on the horizontal axis. Small variations in measurement are normal, but the straight line in FIG. 2 fairly represents the relationship. Thus, a change in modulus, calculated from a change in frequency, can be translated into a change in the CTE of a material.

The significant value in determining the growth of a microcrack over time is the percent change in modulus from a starting point taken as 100%. If the percent change in modulus decreases with time, this is taken to mean that the microcracks, in the material being measured, are growing. An increase in modulus with time indicates that the cracks have stopped growth.

However, some of the substrate is being dissolved and precipitated in the tips of, and along the adjacent walls of, the microcracks. This results in a change of the CTE of the substrate. This alters the CTE balance between the substrate and the active element attached to the substrate. Either change to a substantial degree, is detrimental to effective use of the material. No change in either dimension, or in CTE, would be an ideal situation. As a practical matter, however, positive changes of less than about 10% are deemed acceptable.

Figure 3:
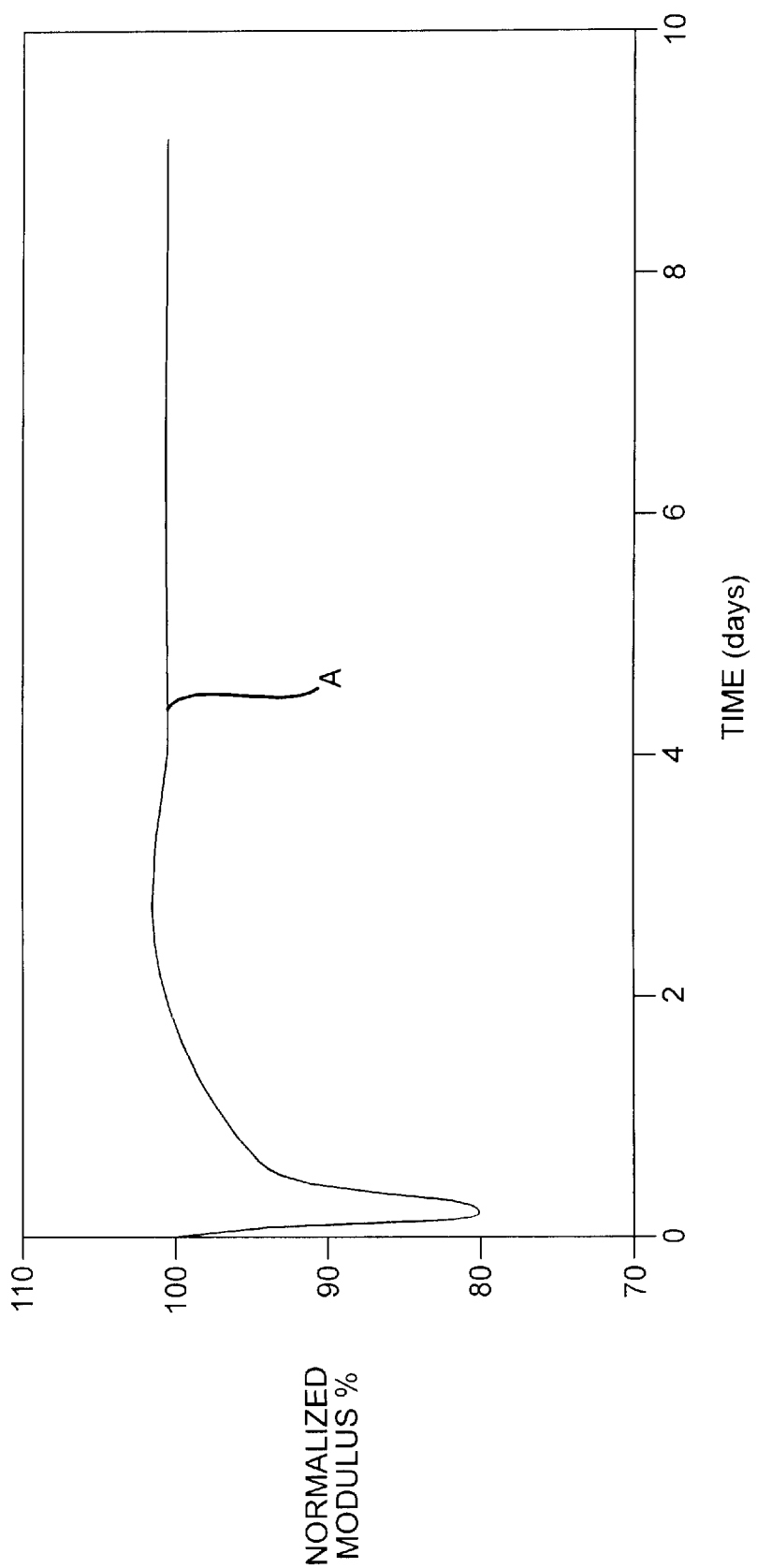
FIGS. 3 and 4 are graphical representations illustrating, for comparison, properties of glass-ceramic bodies not treated in accordance with the present invention.
Figure 4:
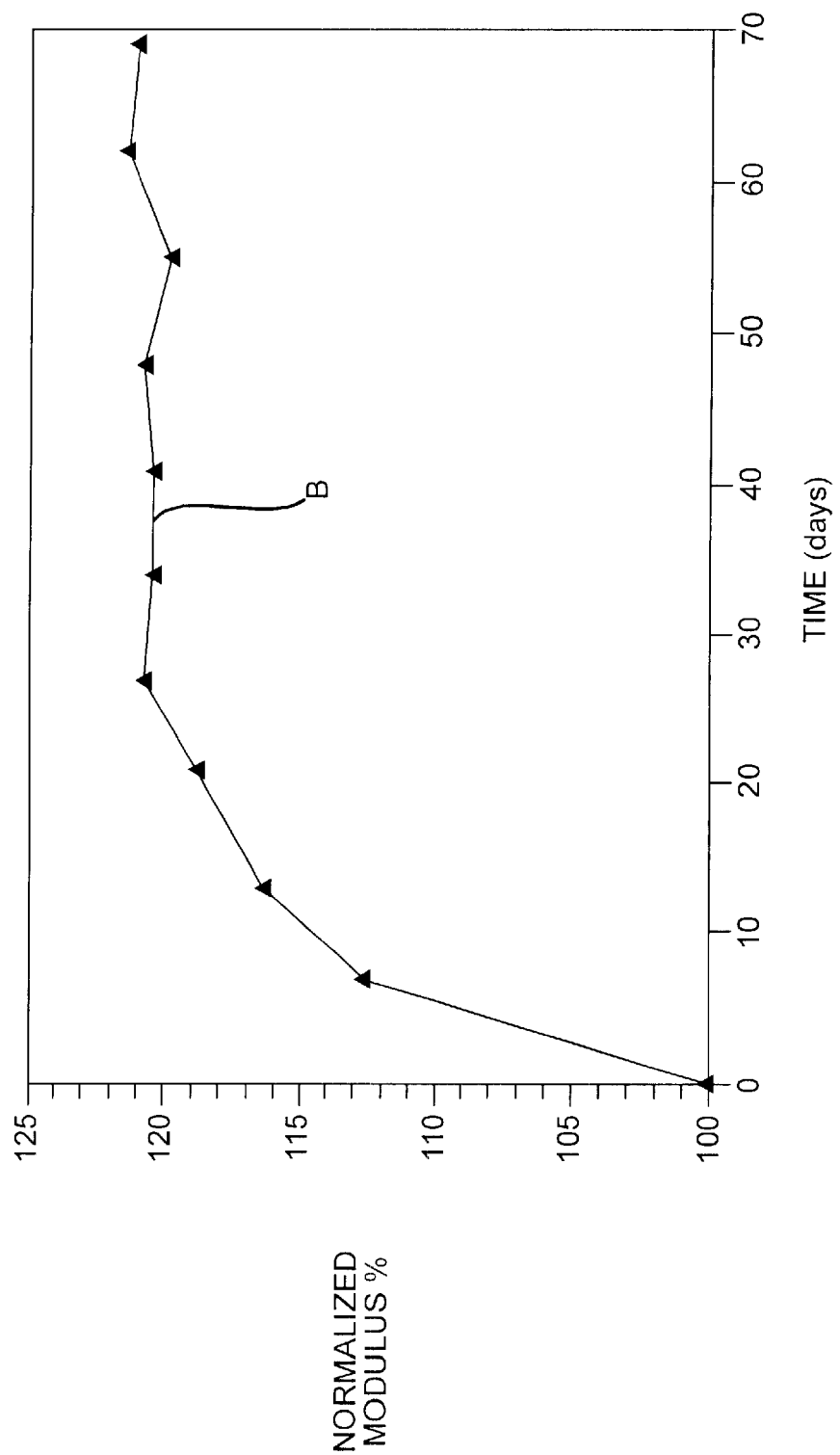

FIGS. 3 and 4 are graphical illustrations showing the change in modulus observed in two bars of beta-eucryptite. One bar was measured directly after ceramming. The other bar was subjected to a prior stabilizing treatment wherein exposure to water was involved. Both test pieces were cerammed at 1300° C. for sixteen hours followed by two cycles to 800° C. In both FIGURES, a normalized modulus, based on a modulus of 100% before exposure, that is immediately after ceramming, is plotted on the vertical axis. Times of exposure, in days, are plotted on the horizontal axis. Curve A, in FIG. 3, shows modulus data for the bar that was exposed, directly after ceramming, to a 100% relative humidity at 22° C. for nine (9) days. Curve B, in FIG. 4, shows modulus data for the bar that was subjected to a stabilizing treatment. That treatment consisted of submerging the sample in water for 24 hours, placing it in a humidor for a week at 85° C. and 85% relative humidity, and then drying the test piece in an oven operating at 100° C. for sixteen hours.

It will be seen that Curve A rapidly drops to about 80% in about three hours. Then it gradually recovers to over 95% at the end of one day. The recovery continues with time, and becomes essentially flat after a few days. In contrast, Curve B rises sharply in a few days to about 120%, and then continues at this level over time. Both of these changes represent an unstable condition that is not acceptable for use in an athermal device.

It became evident that some means of effectively insulating the microcrack material would be necessary to permit its use. It was recognized that some degree of instability might have to be tolerated. However, that degree was much less than that indicated in FIGS. 3 and 4.

This led to consideration of a treatment that would enter the microcracks and block them from exposure to a destabilizing atmosphere. Two silicon-based materials were selected for application to the beta-eucryptite material after ceramming. Initial tests were made in a humidor operating at 100% relative humidity and 22° C. The tests were carried out employing a highly non-polar silane having alkoxy groups, namely (pentafluorophenyl)propyltri-methoxy silane alone, a solution of sodium metasilicate alone, or the two materials applied successively as combination coating materials. The alkoxy group(s) on the silane react with water molecules to hydrolyze the alkoxy group(s), and line the hydrolyzed silane to the glass-ceramic.

Three samples, designated C, D and E, were prepared using essentially identical test pieces of beta-eucryptite. Each test piece was surface treated immediately after ceramming. The substrate of test piece C was treated with a 5% solution of a highly non-polar (pentafluorophenyl) propyltrimethoxy silane. This test piece was immersed in a solution that contains, in addition to the 5% silane: 40% cyclohexane, 40% ethanol, 10% n-butanol and 5% 2-butoxy ethanol. The solution was intentionally maintained free of water to foster a hydrolysis between the silane and adsorbed moisture in the microcracks of the test piece to form a linkage with the surface.

A second test piece, for sample D, was soaked for four days in a 0.4% aqueous solution of sodium metasilicate and then dried in a dessicator.

The third test piece, for sample E, was immersed for two minutes in the sodium metasilicate solution, and then soaked for five days in the silane solution.

Figure 5:
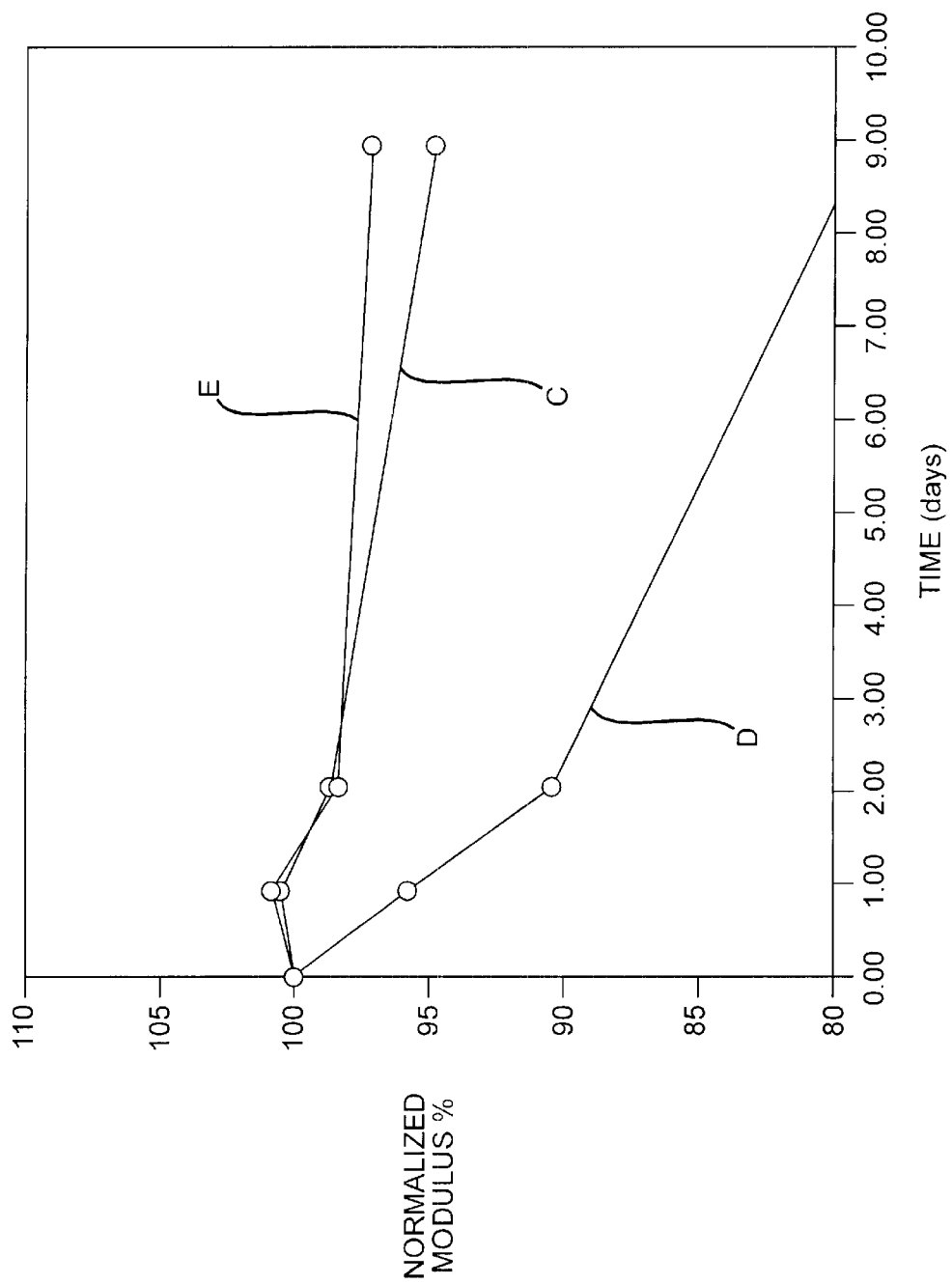
FIGS. 5 and 6 are graphical representations corresponding to FIGS. 3 and 4, but illustrating properties of glass-ceramic bodies treated in accordance with the present invention.

FIG. 5 is a graphical representation that corresponds to FIGS. 3 and 4. It shows the modulus measurements made on samples C, D and E over a period of ten (10) days. Again, modulus is plotted on the vertical axis and time in days on the horizontal. The measured data is plotted as curves C, D and E that correspond to the sample designations.

The results of the above test led to a further study in which, immediately after ceramming, the beta-eucryptite test pieces were soaked overnight (16 hours) in water and then oven dried at 100° C. The substrates for the test pieces, designated F, G and H, were then surface treated as follows:

F. Soaked in 5% (pentafluorophenyl)propyltrimethoxy silane solution for 3.5 days.

G. Soaked in 0.4% sodium metasilicate for 2.5 days, and then stored in a dessicator for one day.

H. Soaked in metasilicate solution for three days followed by a soak in the silane solution for one day.

Figure 6:
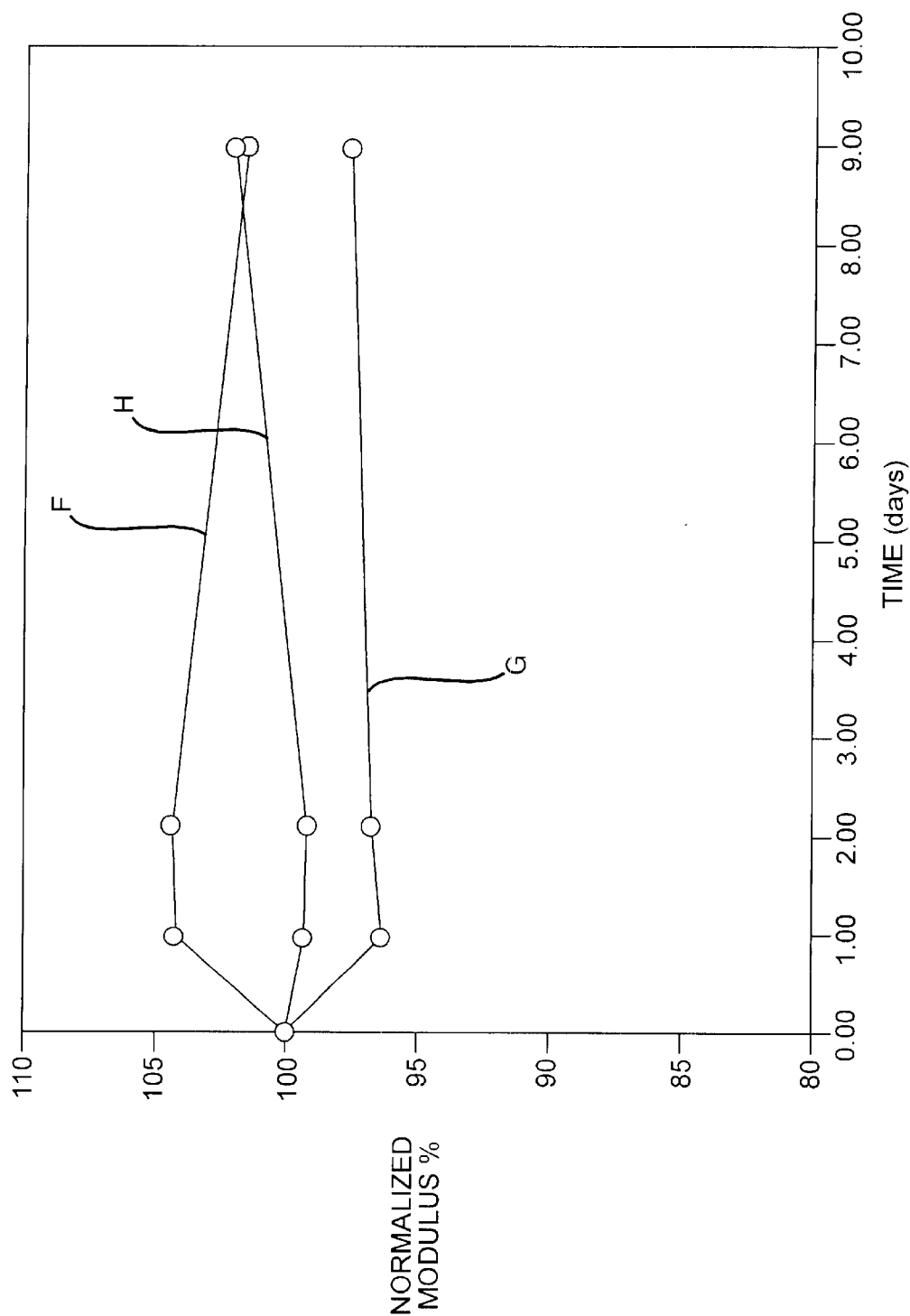

FIG. 6 is a graphical representation that corresponds to FIGS. 3, 4 and 5. It shows modulus values determined for samples F, G and H over a period of ten days. As before, modulus is plotted on the vertical axis and time of exposure, at 22° C. and 100% relative humidity, is plotted on the horizontal axis. The data are plotted as Curves F, G and H, the designations corresponding to the sample designations.

In summary, the data presented in FIGS. 3–6 show that the stability of a microcracked, aluminosilicate glass-ceramic against humid conditions can be improved by application of a coating of sodium metasilicate, or a hydrophobic silane. Preferably, the two coatings are applied successively to the beta-eucryptite surface. The stability can be further improved by a pretreatment in which the glass-ceramic is soaked in water and then dried, preferably by oven baking. The practical effect is to minimize dimensional change with time, and to stabilize the CTE value of the substrate material.

In view of the favorable result obtained at ambient temperature, a series of tests were carried out under industry standard conditions of 85% relative humidity and 85° C. Test bars were exposed to these standard conditions for a period of twenty (20) days. The nature of treatment for each test bar is set forth in the TABLE below. The percent change in normalized modulus was checked at intervals and the final values (the highest positive value) are recorded in the TABLE. Delta CTE values were also determined as the average of three specimens of each test, and are recorded.

TABLE

| Test Bar | Water Soak After Ceram | Subsequent Bake | Soak in Metasilicate | Soak in Silane | % Modulus Change | Average Δ CTE |
| --- | --- | --- | --- | --- | --- | --- |
| 1 | 24 Hours | 24 Hours | 5 Days | 3 Days | +6.4 | 2.49 |
| 2 | 24 Hours | None | 5 Days | 3 Days | +6.8 | 5.39 |
| 3 | None | None | 5 Days | None | +7.5 | 1.47 |
| 4 | None | None | 5 Days | 3 Days | +8.9 | 1.79 |

The lack of a negative change in modulus of the treated test pieces indicates dimensional stability has been achieved. The ability to control the increase in modulus to less than 10% indicates adequate stabilization of the CTE value to permit use of the substrate in an athermal component.

We claim:

1. A method of stabilizing a glass-ceramic body against irreversible changes in dimension and/or in CTE from exposure to a humid atmosphere, the body having microcracks with walls that extend into the body from its surface to create an internal surface area, the method comprising coating the walls of the microcracks with an aqueous solution of an alkali metasilicate, or with a non-aqueous solution of a silane that is less polar than water, or with successive coatings of the alkali metasilicate and the silane, the coatings blocking access of moisture to the microcrack surfaces.

2. A method in accordance with claim 1 which comprises coating the glass-ceramic with a solution of an alkali metasilicate prior to applying the solution of a silane less polar than water.

3. A method in accordance with claim 1 wherein the alkali metasilicate is sodium metasilicate and the silane is (pentafluorophenyl)propyltrimethoxy silane.

4. A method in accordance with claim 1 wherein the silane has hydrolyzable groups that react with water on the glass-ceramic surface to form a linkage with the surface.

5. A method in accordance with claim 1 which comprises soaking the glass-ceramic body in water for a period of time and drying prior to applying a coating.

6. A method in accordance with claim 1 which comprises applying said coating to the surface of the glass-ceramic and determining the effectiveness of the coating in stabilizing a glass-ceramic body against changes in dimension and/or CTE by repeatedly measuring the frequency of a selected mechanical resonance mode at spaced intervals of time.

7. A method in accordance with claim 1 which comprises providing a silane less polar than water and having alkoxy groups and a glass-ceramic body having water molecules on its surface, applying a coating of the silane to the glass-ceramic, reacting the alkoxy group on the silane with the water molecules to hydrolyze the alkoxy group, and link the hydrolyzed silane to the glass-ceramic surface.

8. A method in accordance with claim 1 wherein the less-polar silane is (pentafluorophenyl)propyltrimethoxy silane.

* * * * *